(12) United States Patent
Johansson et al.

(10) Patent No.: US 7,520,700 B2
(45) Date of Patent: Apr. 21, 2009

(54) MILLING CUTTER AND CUTTING INSERT THEREFOR

(75) Inventors: Åke Johansson, Sandviken (SE); Kenneth Lundberg, Gimo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/110,854

(22) Filed: Apr. 21, 2005

(65) Prior Publication Data

US 2005/0238445 A1    Oct. 27, 2005

(30) Foreign Application Priority Data

Apr. 22, 2004    (SE) .................................. 0401027

(51) Int. Cl.
*B23B 27/16* (2006.01)
*B23C 5/20* (2006.01)

(52) U.S. Cl. ...................... 407/114; 407/115; 407/113; 407/116

(58) Field of Classification Search ............. 407/33–35, 407/42, 43, 53, 66, 67, 113–117
See application file for complete search history.

(56) References Cited

U.S. PATENT DOCUMENTS

| | | | | |
|---|---|---|---|---|
| 5,695,303 A | * | 12/1997 | Boianjiu et al. | 407/114 |
| D481,046 S | * | 10/2003 | Gainer | D15/139 |
| D482,375 S | * | 11/2003 | Gainer | D15/139 |
| 6,761,514 B2 | * | 7/2004 | Cirino | 408/203.5 |

FOREIGN PATENT DOCUMENTS

| | | |
|---|---|---|
| DE | 196 27 822 | 11/1997 |
| DE | 199 51 136 | 7/2005 |
| JP | 4-371374 | 12/1992 |

\* cited by examiner

*Primary Examiner*—Willmon Fridie
(74) *Attorney, Agent, or Firm*—Drinker Biddle & Reath LLP (57) ABSTRACT

A milling cutter for sharpening welding electrodes includes a tool body, and a plurality of cutting inserts fastened to the tool body. The inserts include a center cutting insert and at least two peripheral cutting inserts. Each peripheral cutting insert includes at least one cutting edge. The center cutting insert defines: two oppositely facing principle planes, two cutting edges disposed adjacent respective ones of the principle planes, and a concave surface extending between such cutting edges. The center cutting insert can cut (sharpen) the end surfaces of two welding electrodes simultaneously.

14 Claims, 11 Drawing Sheets

MILLING CUTTER AND CUTTING INSERT THEREFOR

The present application claims priority under 35 U.S.C. § 119 to Patent Application Serial No. 0401027-8 filed in Sweden on Apr. 22, 2004.

TECHNICAL FIELD OF THE INVENTION

The present invention relates to a milling cutter, intended to sharpen electrodes for welding, the milling cutter comprising a tool body as well as a number of cutting inserts fastened in the tool body, including at least one center cutting insert having two principal planes located at a distance from each other. At least one cutting edge is associated with the respective principal plane. The cutting inserts also include at least two peripheral cutting inserts, each of which has at least one cutting edge. The invention also separately relates to a cutting insert, which is included in the milling cutter according to the present invention.

DESCRIPTION OF PRIOR ART

Electrode sharpeners are previously known, which are used to recondition deformed electrodes, especially electrodes for spot-welding. Such electrodes are deformed after a certain time of use by a deposition being formed on the surfaces of the electrodes that are active in connection with the welding. This affects to a large extent the function of the electrode by the fact that the current density of the electrode drastically drops. It is not unusual that the current density decreases by more than 30%.

A previously known electrode sharpener comprises three cutting inserts, the electrode sharpener simultaneously machining a pair of electrodes, i.e., two electrodes having a common longitudinal axis as well as the active surfaces thereof facing each other. It has turned out that the known electrode sharpener does not remove the depositions on the electrodes by means of cutting machining but rather by means of shearing, with heat being generated in connection with the shearing. Even if the surfaces that are re-created on the electrodes become entirely free from the depositions, these surfaces do not have a desired finish since the heat generated in connection with the shearing results in so-called "built-up edge formation", i.e., material from the electrodes sticks to the cutting edges. When a certain quantity of material has been accumulated on a cutting edge, this material loosens from the cutting edge and sticks to the surface of the electrode, which entails that the surface becomes uneven.

OBJECTS AND FEATURES OF THE INVENTION

A primary object of the present invention is to provide a milling cutter of the kind mentioned in the introduction, which milling cutter machines the welding electrodes by means of cutting machining.

Another object of the present invention is that the re-created surfaces on the electrodes in principle should be entirely free from the depositions deforming the electrodes.

Yet an object of the present invention is that the re-created surfaces on the electrodes should have a satisfactory surface finish.

SUMMARY OF THE INVENTION

At least the primary object of the present invention is realized by a cutting insert for chip-removing machining. The insert defines two oppositely facing principle planes. Cutting edges are disposed adjacent respective ones of the principle planes. A concave surface extends between the cutting edges.

Another aspect of the invention relates to a milling cutter for sharpening welding electrodes. The cutter comprises a tool body, and a plurality of cutting inserts fastened to the tool body. The inserts include a center cutting insert and at least two peripheral cutting inserts. Each peripheral cutting insert includes at least one cutting edge. The center cutting insert defines: two oppositely facing principle planes, two cutting edges disposed adjacent respective ones of the principle planes, and a concave surface extending between such cutting edges.

BRIEF DESCRIPTION OF THE DRAWINGS

Below, preferred embodiments of the invention will be described, reference being made to the accompanying drawings, where.

DESCRIPTION OF PREFERRED EMBODIMENTS OF THE INVENTION

The milling cutter shown in FIGS. 1-4 comprises a tool body 1, which is provided with three cutting inserts 3, 5 and 7. The first cutting insert 3 is intended to machine a center portion of the electrodes while the second and third cutting inserts 5 and 7, respectively, are intended to machine a conical part of the electrodes. Each one of the cutting inserts 3, 5 and 7 will be described more in detail below.

Figure 2:
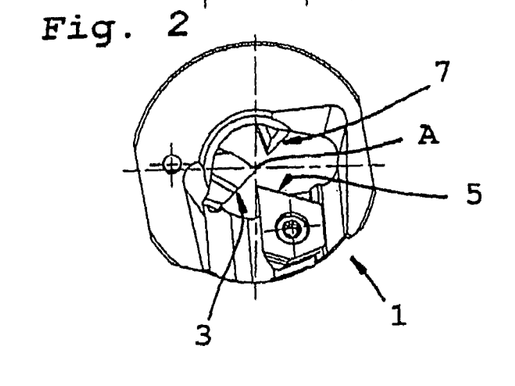
FIG. 2 shows a planar front-end view of the milling cutter according to FIG. 1.
Figure 4:
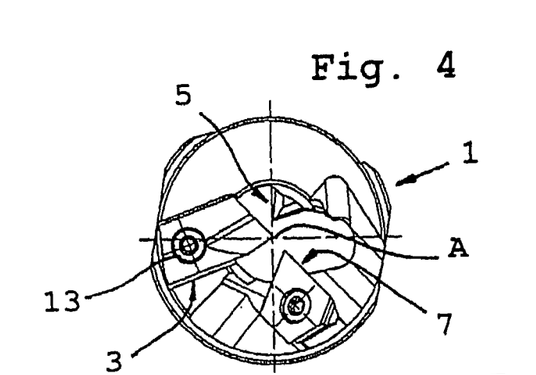
FIG. 4 shows a planar rear-end view of the milling cutter according to FIG. 1.

The tool body 1 is intended to be received in a stand (not shown) or the like, the stand being provided with means to rotate the tool body 1 around a center axis A, which accordingly extends perpendicularly to the paper in FIGS. 2 and 4. This is conventional technology and is, therefore, not described closer in detail. The center axis A also defines the axial direction of the milling cutter.

In FIGS. 6-10, the first cutting insert 3 is shown in detail. The cutting insert 3 is generally in the shape of a polygon and comprises two parallel principal planes 10 and 11 as well as a through hole 12 for a fixing screw 13, see FIG. 4. Furthermore, the cutting insert 3 has two first cutting edges 14, 15 as well as a first chip surface 16 extending between the first cutting edges 14, 15, which chip surface is concave, i.e., it curves in toward the center of the cutting insert 3. According to the shown embodiment, the chip surface 16 defines a radius of curvature R, see FIG. 8. According to the invention, the radius of curvature R should fall in the interval of $0.5h<R<10h$, where "h" is the height of the cutting insert 3, see FIG. 8.

Figure 9:
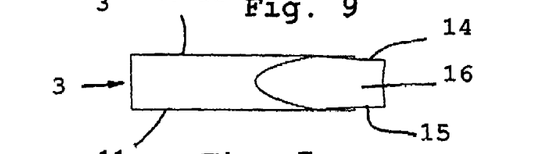
FIG. 9 shows a side view of the cutting insert according to FIG. 6.
Figure 10:
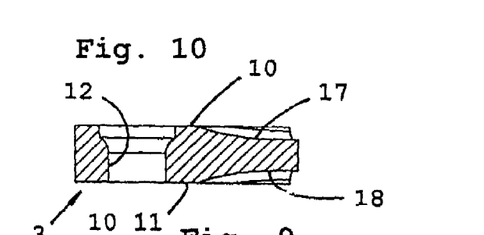
FIG. 10 shows a section according to X-X in FIG. 7.

As is best seen in FIG. 9, the first cutting edges 14, 15 are slightly concavely curved, the curving being oriented so that the first cutting edges 14, 15 curve toward each other. The reason for the first cutting edges 14, 15 having been given this curving will be clear from the description below. Inside each one of the first cutting edges 14, 15, an appurtenant first clearance surface 17 and 18, respectively, is located, these first clearance surfaces 17, 18 converging toward each other in the direction away from the chip surface 16, see FIG. 8. The angle that a clearance surface 17 or 18 forms with an appurtenant principal plane 10 and 11, respectively, has been designated α. In an exemplifying and not limiting purpose, it may be mentioned that a suitable value of α falls in the interval of $1°<α<40°$, preferably in the interval of $7°<α<15°$. In the embodiment of the cutting insert 3 shown in FIG. 8, $α=10°$. Thus, the two edge portions of the cutting insert 3 have a distinct positive cutting geometry, which to a great extent guarantees that the first cutting edges 14, 15 perform cutting machining when the electrodes are reconditioned.

Figure 11:
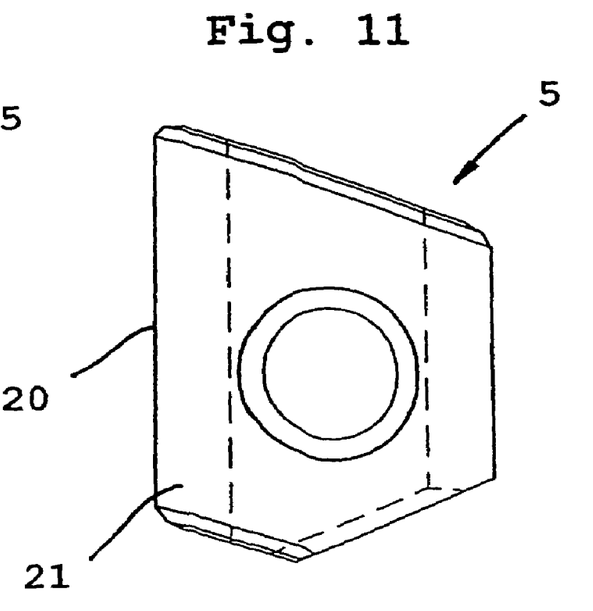
FIG. 11 shows a planar view of a peripheral cutting insert included in the milling cutter according to FIGS. 1-4.
Figure 12:
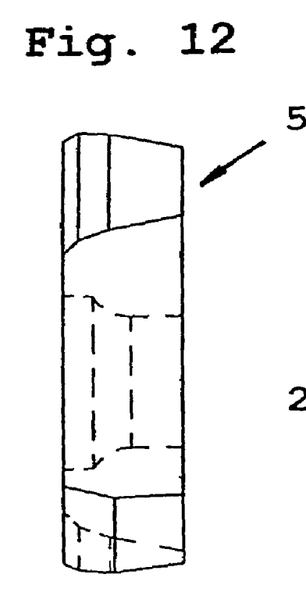
FIG. 12 shows a first side view of the cutting insert according to FIG. 11.
Figure 13:
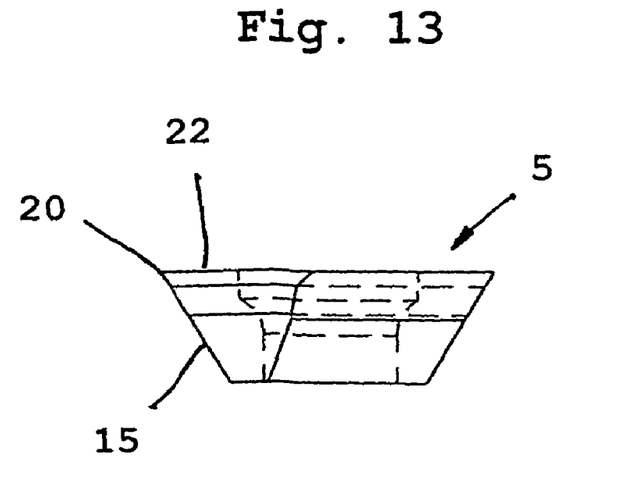
FIG. 13 shows a second side view of the cutting insert according to FIG. 11.

The second cutting insert 5 is shown in FIGS. 11-13, the second cutting insert 5 generally being of a polygon basic shape in planar view, see FIG. 11. The second cutting insert 5 has a second cutting edge 20, to which a second chip surface 21, as well as a second clearance surface 22, connect. Also in this case, the edge portion of the second cutting insert 5 has a distinct positive cutting geometry.

Figure 14:
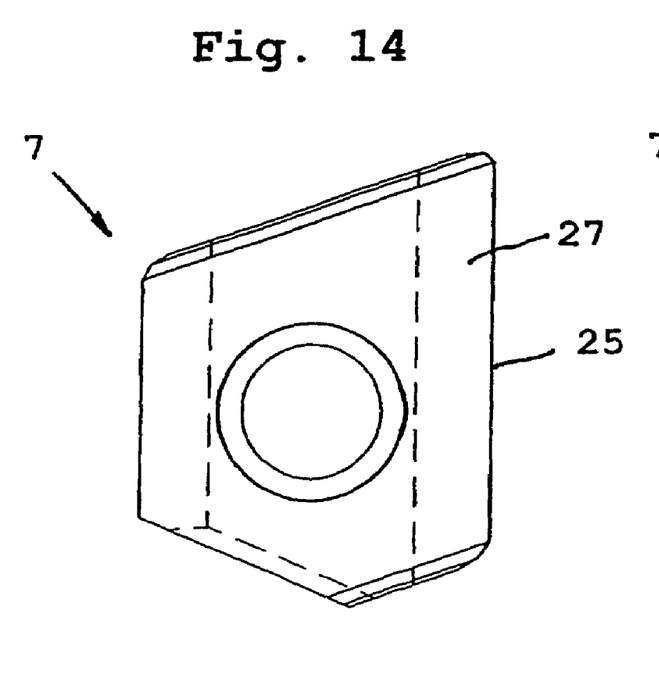
FIG. 14 shows a planar view of an additional peripheral cutting insert included in the milling cutter according to FIGS. 1-4.
Figure 15:
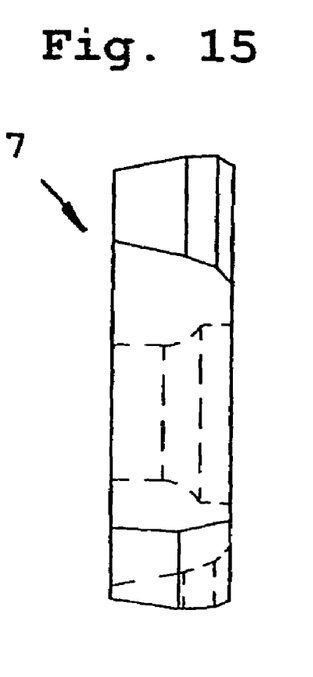
FIG. 15 shows a first side view of the cutting insert according to FIG. 14.
Figure 16:
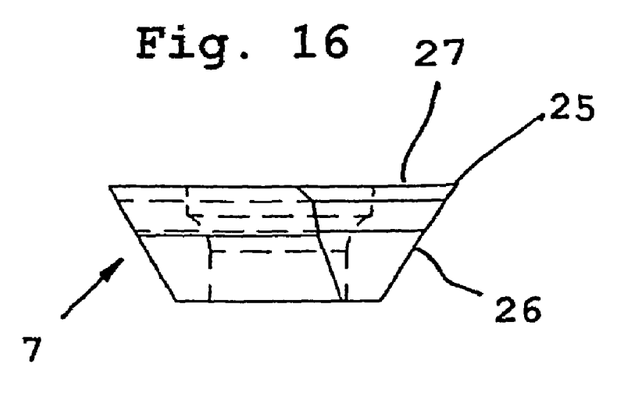
FIG. 16 shows a second side view of the cutting insert according to FIG. 14.

The third cutting insert 7 is shown in FIGS. 14-16, the third cutting insert 7 being mirror-inverted in relation to the second cutting insert 5. This is realized by studying FIG. 11 and FIG. 14. In correspondence with the second cutting insert 5, the third cutting insert 7 is of a polygonal basic shape in planar view, see FIG. 14. The third cutting insert 7 has also a third cutting edge 25, to which a third chip surface 26 as well as a third clearance surface 27 connect. The edge portion of the third cutting insert 7 has a distinct positive cutting geometry.

Figure 1:
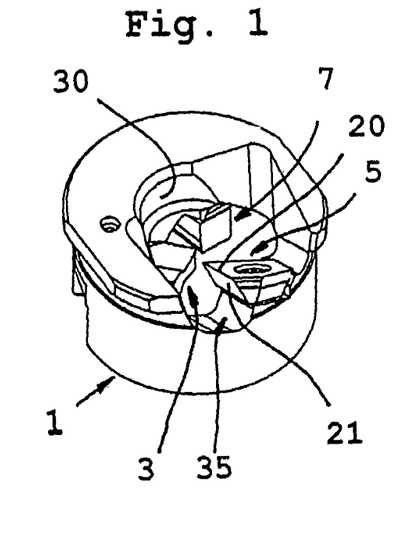
FIG. 1 shows a front perspective view of a first embodiment of a milling cutter according to the present invention.
Figure 5:
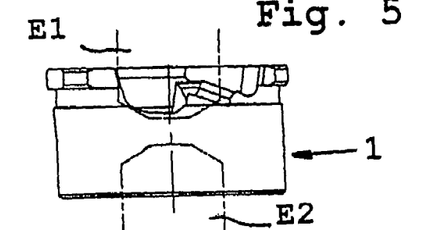
FIG. 5 shows a schematic side view of the milling cutter according to the present invention as well as illustrates the orientation in relation to the milling cutter of the two electrodes that are to be machined.
Figure 6:
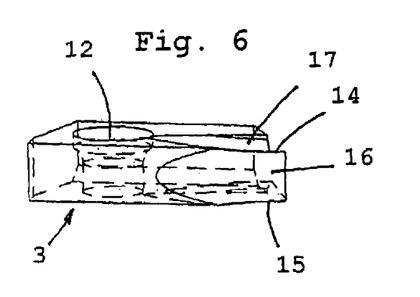
FIG. 6 shows a perspective view of a center cutting insert included in the milling cutter according to the present invention.
Figure 7:
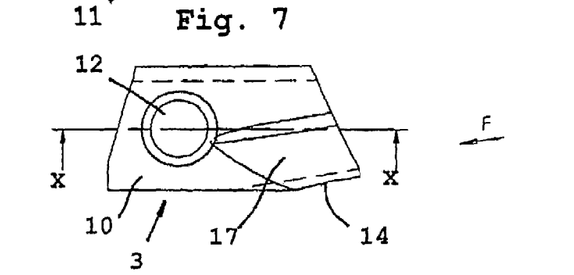
FIG. 7 shows a planar view of the cutting insert according to FIG. 6.
Figure 8:
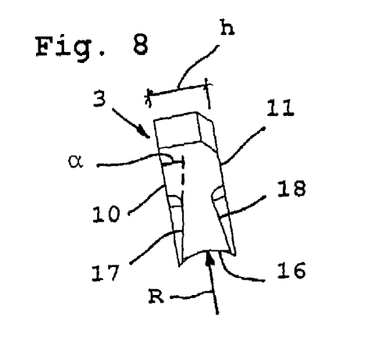
FIG. 8 shows a view of the cutting insert in the direction of the arrow F in FIG. 7.

Reference is now made again to FIGS. 1-4. As is seen in FIG. 1, the front portion of the tool body 1 is formed with a first support surface 30, which generally is of a circular cylindrical shape and is intended to support a first electrode E1 that is to be machined by the milling cutter according to the present invention. In FIG. 5, it is schematically shown how a first electrode E1 is oriented in relation to the milling cutter according to the present invention when machining of the free end of the first electrode E1 is to be effected. The rear portion of the tool body 1 has a second support surface 31, see FIG. 3, which likewise generally is of a circular cylindrical shape. This second support surface 31 is intended to support a second electrode E2 that is to be machined by the milling cutter according to the present invention. In FIG. 5, it is schematically shown how the second electrode E2 is oriented in relation to the milling cutter according to the present invention. In this connection, it should be pointed out that the milling cutter according to the present invention consequently machines two electrodes E1 and E2 simultaneously.

The tool body 1 has also a first chip space 35 of a substantial size adjacent to the insert pocket of the second cutting insert 5. The insert pocket is the surface that carries the second cutting insert 5. When the second cutting insert 5 is mounted in the insert pocket thereof in the tool body 1, see FIG. 1, the first chip space 35 is located adjacent to the second chip surface 21 of the second cutting insert 5. By the fact that the first chip space 35 has an axial extension in the direction away from the second cutting insert 5, sufficient space is provided for the chips and chip stopping is avoided to the greatest extent when the second cutting insert 5 machines the first electrode E1.

Figure 3:
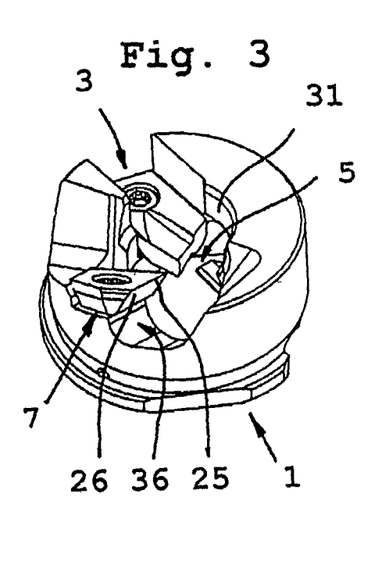
FIG. 3 shows a rear perspective view of the milling cutter according to FIG. 1.

In FIG. 3, it is seen that adjacent to the chip surface 26 of the third cutting insert 7, the tool body 1 has a second chip space 36 of a good size, which likewise has an axial extension away from the appurtenant third cutting insert 7. This ensures that sufficient space is provided for the chips and thereby chip stopping is avoided to the greatest extent. Common to the two chip spaces 35, 36 is that they penetrate the periphery of the tool body 1.

Figure 17:
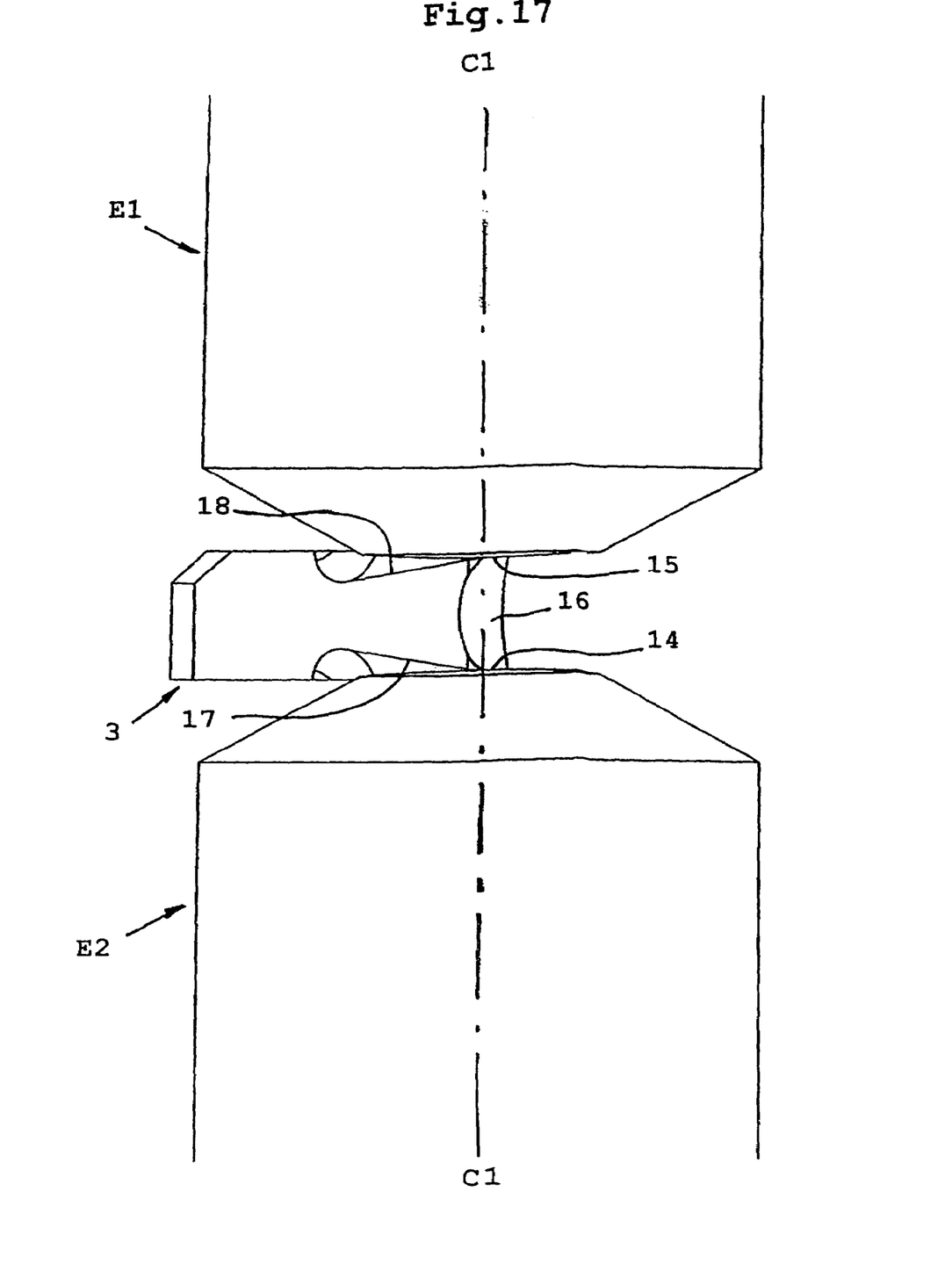
FIG. 17 shows a schematic side view that illustrates how the center cutting insert simultaneously machines two electrodes.

In FIG. 17, it is schematically shown how the center cutting insert 3 simultaneously machines two electrodes E1 and E2, the center cutting insert 3 more precisely machining the central, slightly convex part of each electrode E1, E2. For that purpose, the cutting edges 14, 15 are somewhat concavely curved, to which attention has been called above in the description of the center cutting insert 3 in connection with FIG. 9. In FIG. 17, it is also seen that the orientation of the clearance surfaces 17 and 18 ensures that there is a sufficient clearance in relation to the slightly convex center part of each one of the electrodes E1, E2. In the active position shown in FIG. 17 of the center cutting insert 3, this insert will accordingly rotate around the common center axis C1-C1 of the electrodes, wherein the cutting insert 3 thereby will move into the paper, from the left to the right. In that connection, the cutting edges 14 and 15 will machine the slightly convex center part, wherein the generated chips will be deflected via the chip surface 16. Since both the cutting edges 14, 15 are active simultaneously, the chips from the respective cutting edge will meet in the center of the chip surface 16.

Figure 18:
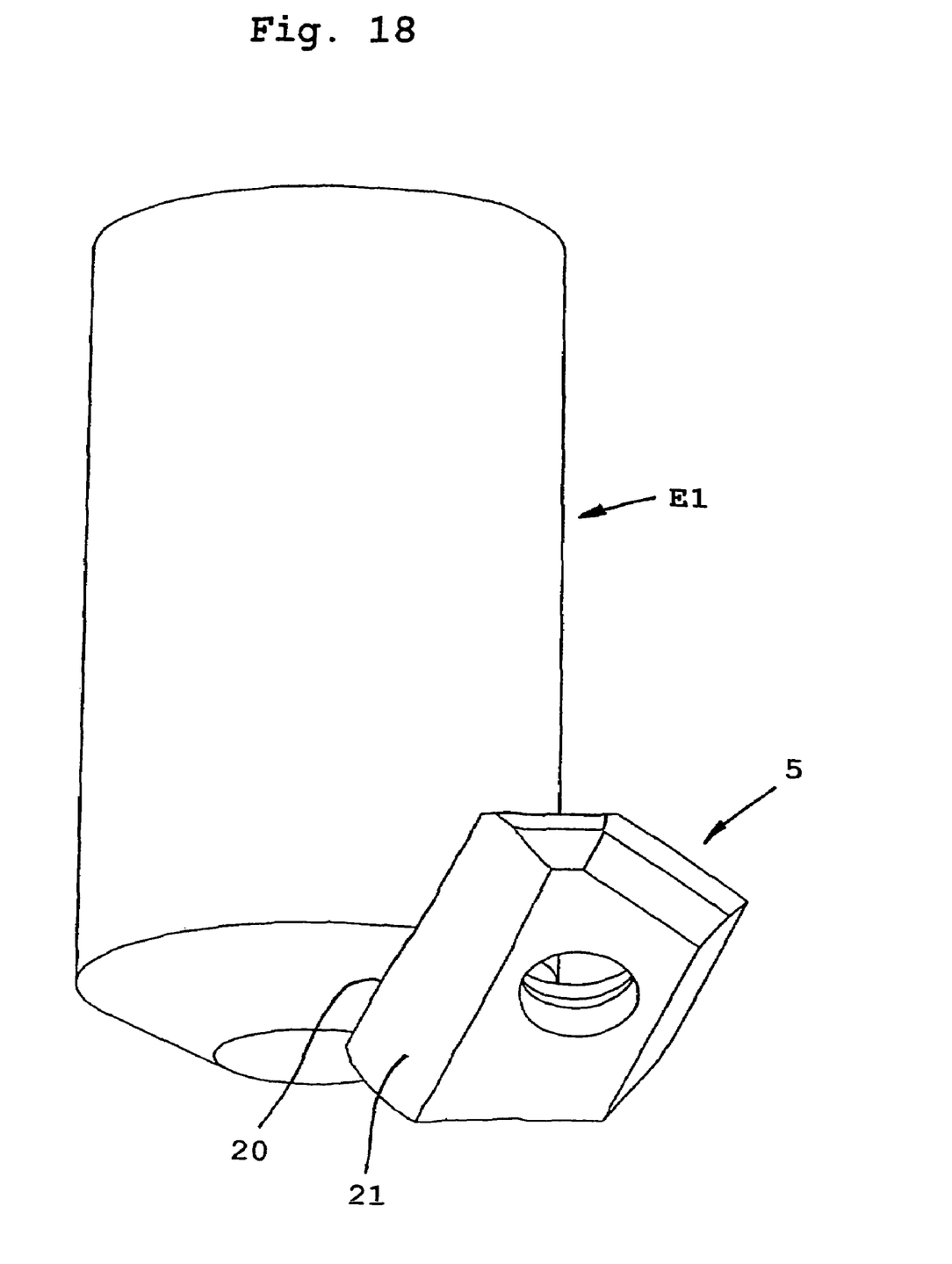
FIG. 18 shows a schematic perspective view that illustrates how a peripheral cutting insert machines the conical surface of an electrode.
Figures 19, 21:
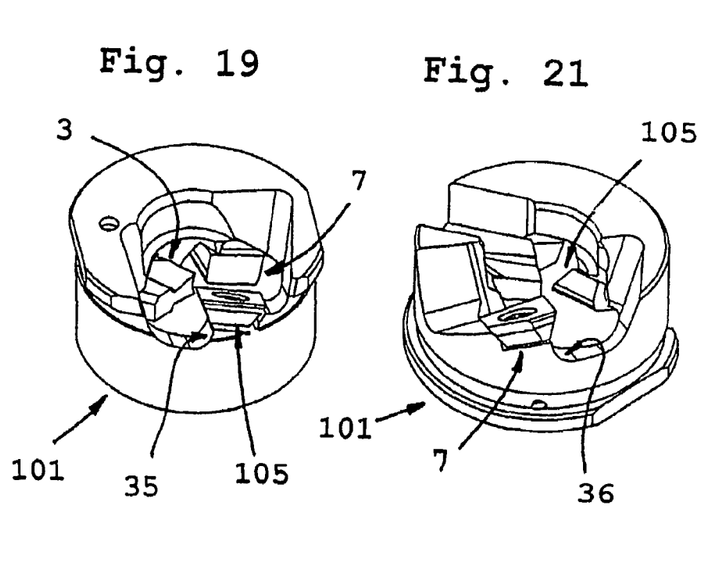
FIG. 19 shows a perspective view from the front of an alternative embodiment of a milling cutter according to the present invention.
FIG. 21 shows a perspective view from the rear of the milling cutter according to FIG. 19.
Figure 20:
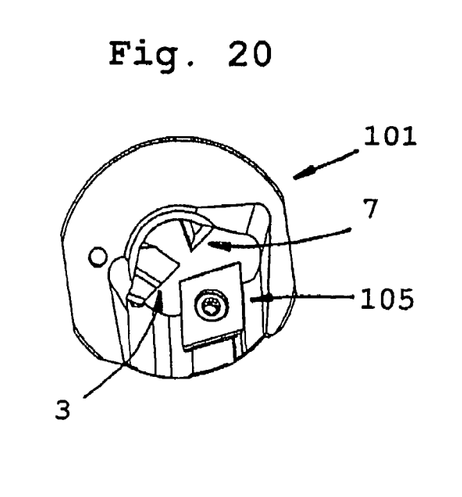
FIG. 20 shows a planar view from above of the milling cutter according to FIG. 19.
Figure 22:
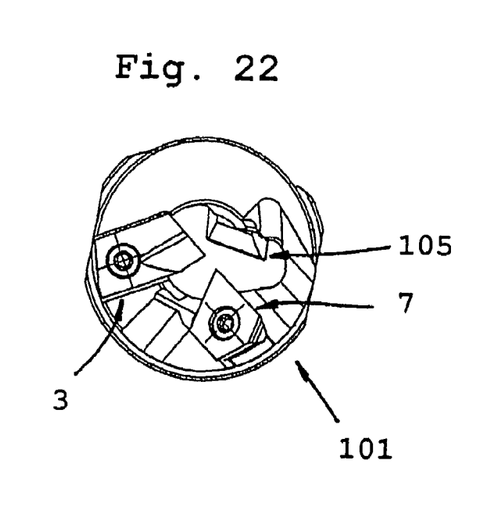
FIG. 22 shows a planar view from the rear of the milling cutter according to FIG. 19.

In FIG. 18, it is schematically shown how the second cutting insert 5, i.e., a peripheral cutting insert, machines the conical surface of the electrode E1. In that connection, the cutting edge 20 of the cutting insert 5 will come into engagement with the conical surface, wherein the chips generated will be deflected via the second chip surface 21. Even if it is not seen in FIG. 17, the clearance surface 22 is angled away from the conical surface, which guarantees that sufficient clearance is obtained upon machining by means of the second cutting insert 5.

In FIGS. 19-22, an alternative embodiment of a milling cutter 101 according to the present invention is shown. In correspondence with the milling cutter according to FIGS. 1-4, a tool body 101 is provided with three cutting inserts. The tool body 101 may in principle be identical to the tool body 1, however the design of the insert pocket of one of the peripheral cutting inserts may to a certain extent be different. The tool body 101 is provided with a first center cutting insert 3, which is identical to the center cutting insert 3 in the milling cutter according to FIGS. 1-4. For that reason, these cutting inserts have been given the same reference designation.

Figure 23:
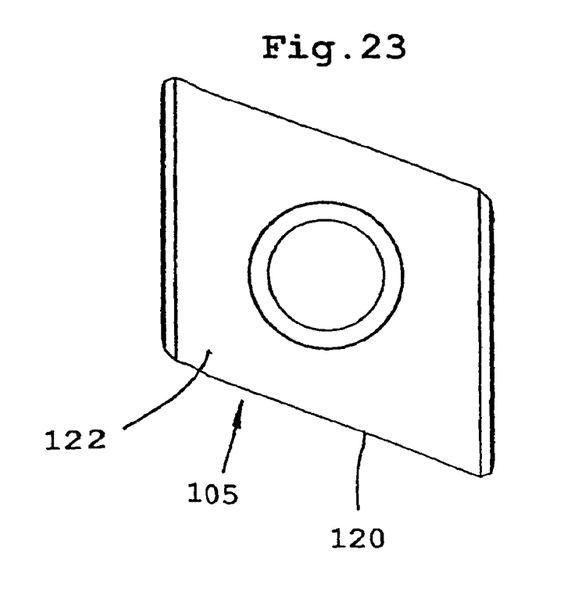
FIG. 23 shows a planar view of a peripheral cutting insert included in the milling cutter according to FIGS. 19-22.
Figure 24:
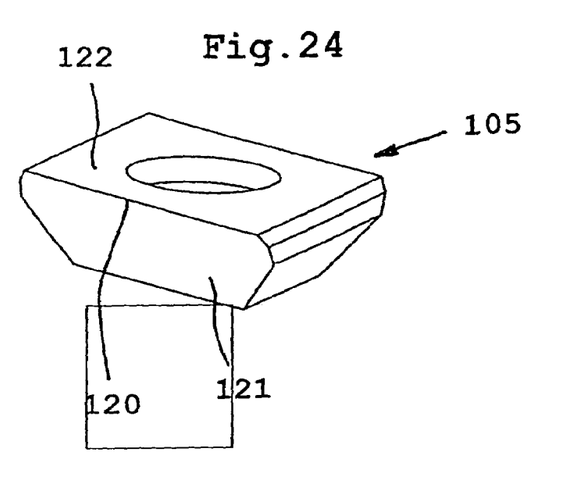
FIG. 24 shows a perspective view of the cutting insert according to FIG. 23.
Figures 25, 28:
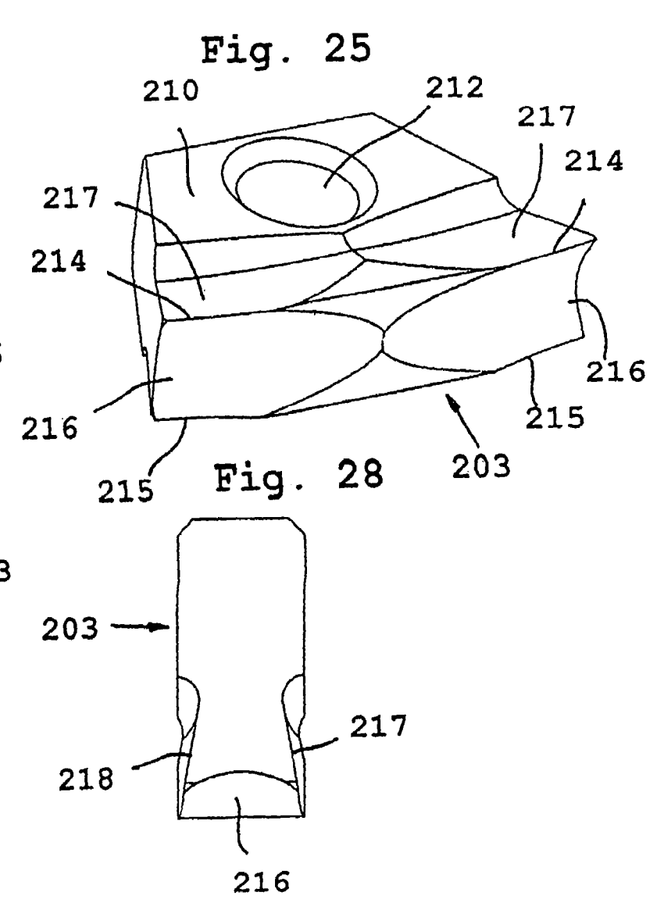
FIG. 25 shows a perspective view of an alternative center cutting insert.
FIG. 28 shows a side view of the cutting insert according to FIG. 25.

The second peripheral cutting insert 105 has a different design than the second peripheral cutting insert 5 in the embodiment according to FIGS. 1-4. The second peripheral cutting insert 105 is shown in detail in FIG. 23. As is seen in FIG. 23, the cutting insert 105 is of a rhomboidal basic shape in planar view. The cutting insert 105 is provided with a cutting edge 120, a second chip surface 121 located adjacent to the cutting edge as well as a second clearance surface 122 located adjacent to the cutting edge 120.

The third peripheral cutting insert 7 has a design that is identical to the third peripheral cutting insert 7 in the embodiment according to FIGS. 1-4. The purpose of the alternative embodiment according to FIGS. 19-22 is to show that the peripheral cutting inserts need not be mirror-inverted with the same basic shape. In correspondence with the embodiment according to FIGS. 1-4, the tool body 101 is provided with two chip spaces 35, 36 adjacent to the peripheral cutting inserts, i.e., the second and third cutting inserts 105 and 7.

The milling cutter according to the alternative embodiment works in principally the same way-as the milling cutter according to FIGS. 1-4. The cutting insert 105 also has a positive cutting geometry, and therefore the machining by the cutting insert 105 of the conical surface of the electrode E1 is effected by means of cutting machining.

In FIGS. 25-28, an alternative design is shown of a center cutting insert 203 of a milling cutter according to the present invention. The center cutting insert according to FIGS. 25-28 is generally in the shape of a polygon and comprises two parallel principal planes 210 and 211 as well as a through hole 212 for a fixing screw. Such as is most clearly seen in FIG. 26, the cutting insert 203 is symmetrical in respect of a center line C2-C2.

Figure 27:
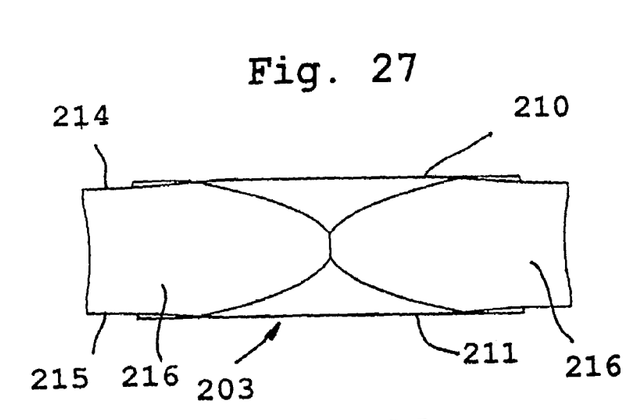
FIG. 27 shows a front view of the cutting insert according to FIG. 25.

Thus, the cutting insert 203 has two pairs of first cutting edges 214, 215 as well as two first chip surfaces 216 that extend between each one of the pair of first cutting edges 214, 215. The chip surfaces 216 are concave, i.e., they curve in toward the center of the cutting insert 203. Such as is best seen in FIG. 27, the first cutting edges 214, 215 are slightly curved, the curving being so oriented that within each pair the first cutting edges 214, 215 curve toward each other. Inside each one of the first cutting edges 214, 215 an appurtenant first clearance surface 217 and 218, respectively, is located, within each pair these first clearance surfaces 217, 218 converging toward each other in the direction away from the appurtenant chip surface 216. Thus, the four edge portions of the cutting insert 203 have distinct positive cutting geometry, which to a great extent guarantees that the first cutting edges 214, 215 perform cutting machining when the electrodes are reconditioned.

Figure 26:
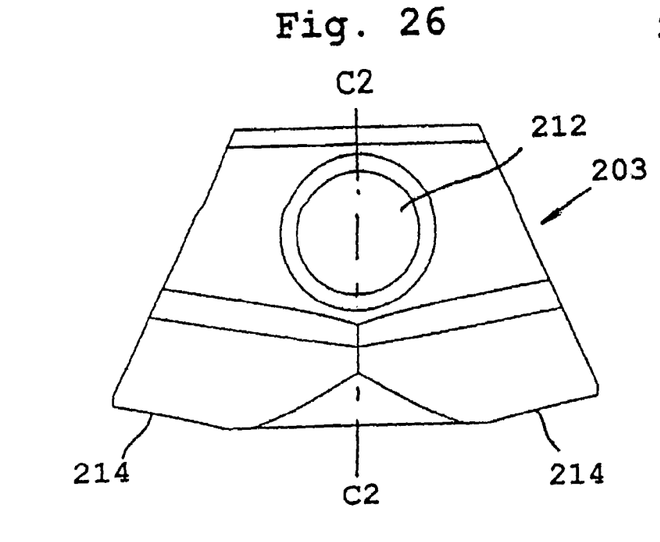
FIG. 26 shows a planar view of the cutting insert according to FIG. 25.

By the fact that the cutting insert 203 is symmetrical in respect of the symmetry line C2-C2, the cutting insert 203 may be rotated around the same symmetry line when a first pair of cutting edges 214, 215 has been worn out.

FIGS. 29-32 show a still further embodiment of a milling cutter according to the present invention, said milling cutter comprising a tool body 301. There is a principal structural difference between the tool body 301 and the previously described tool bodies 1, 101. Thus, the tool body 301 comprises two recessed portions 330 and 331 at two axially opposite ends of the tool body 301. Each recessed portion 330, 331 comprises an axially facing border 332 and 333, respectively. As is evident from FIGS. 29 and 30 the borders 332 and 333 are not circumferentially closed; rather the border 333 is interrupted at two locations. Each recessed portion 330, 331 also comprises an axially facing base surface 334 and 335 respectively, said base surfaces 334, 335 generally having an extension transverse to the axial direction of the tool body 301. The base surface 335 is divided into two sub surfaces. A number of internally threaded holes 336 and 337 are provided in each base surface 334, 335.

The milling cutter according to FIGS. 29-32 also comprises two supporting/guiding means in the shape of washers 338 and 339. Each washer 338, 339 is provided with a central, circular opening 340 and 341. Each washer 338, 339 is also provided with a number of through holes 342 and 343, said through holes 342, 343 being positioned to match the internally threaded holes 336 and 337.

Figure 29:
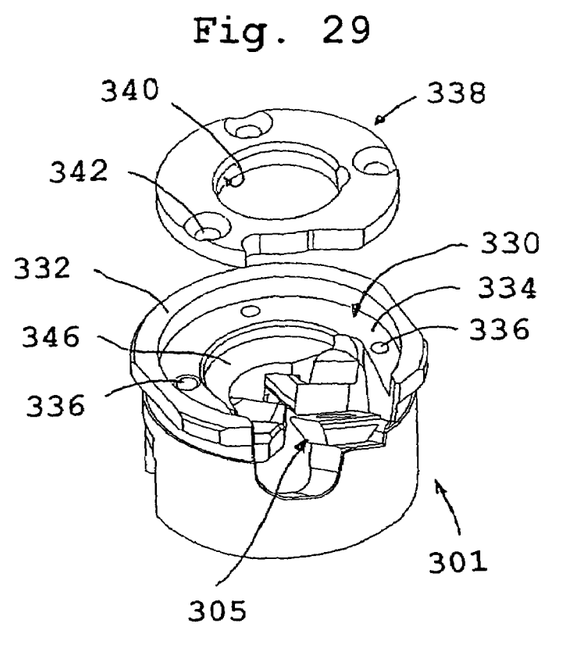
FIG. 29 shows a perspective exploded view from the front of a further alternative embodiment of a milling cutter according to the present invention.
Figure 30:
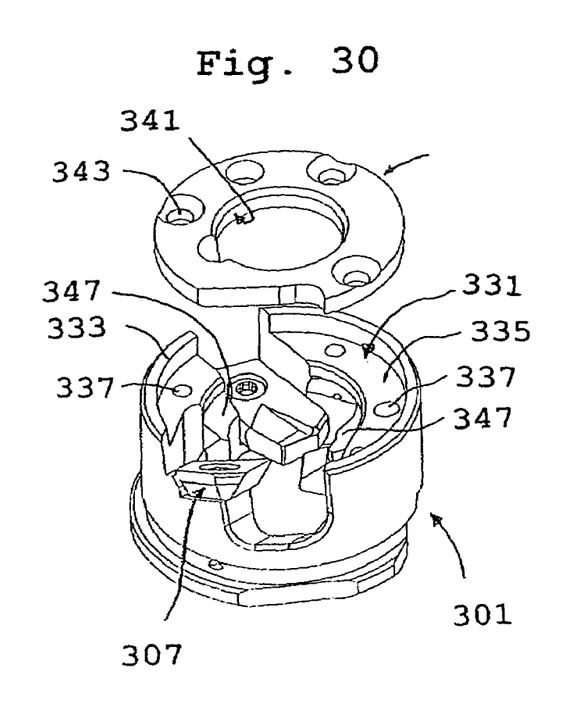
FIG. 30 shows a perspective exploded view from the rear of the milling cutter according to FIG. 29.
Figure 31:
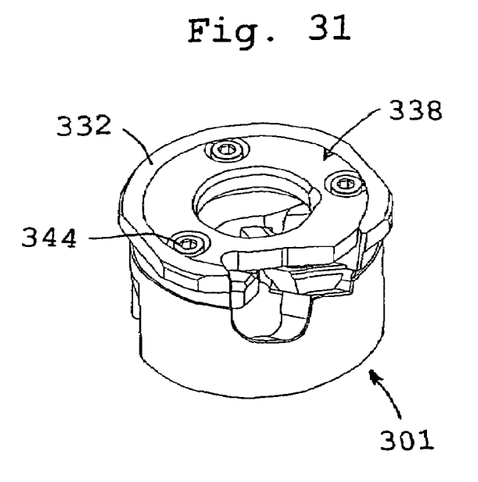
FIG. 31 shows a perspective view from the front of the milling cutter according to FIG. 29 when the supporting/guiding means is mounted.
Figure 32:
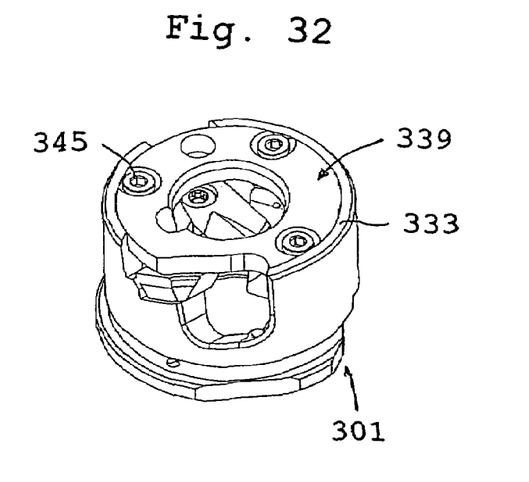
FIG. 32 shows a perspective view from the rear of the milling cutter according to FIG. 31.

FIGS. 29 and 30 show exploded views of the milling cutter wherein the washers 338 and 339 are distanced from the recessed portions 330 and 331 respectively. In FIGS. 31 and 32 the washers 338 and 339 are mounted in their respective recessed portion 330 and 331. The washers 338 and 339 are fixed in the recessed portions 330, 331 by means of screws 344 and 345. When studying FIGS. 31 and 32 it is evident that the central, circular openings 340, 341 will effect a supporting/guiding action on the electrode that is being sharpened. Of course the diameter of the circular openings 340, 341 is adapted to the diameter of the electrode.

As is most evident from FIGS. 29 and 30 the tool body 301 is provided with axially facing abutment surfaces 346 and 347, said abutment surfaces 346, 347 constituting stop means for the electrodes when they are positioned to be machined. The abutment surface 347 is divided into two sub surfaces. Since the electrodes contact the abutment surfaces 346, 347 it is guaranteed that only a limited amount of material is removed from the electrodes in connection with the machining.

Figure 33:
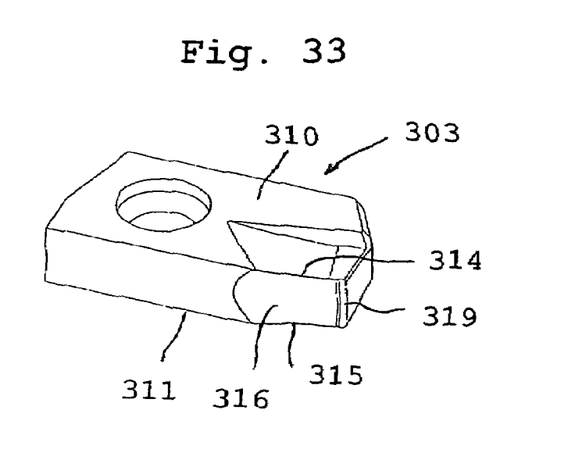
FIG. 33 shows a perspective view of a further alternative embodiment of a center cutting insert.

The milling cutter according to FIGS. 29-32 is provided with a somewhat modified first cutting insert 303 that is separately shown in FIG. 33. The peripheral cutting inserts 305, 307 may have a design that corresponds to the cutting inserts 5 and 7.

The first cutting insert 303 has a base shape that corresponds to the base shape of the first cutting insert 3 according to FIGS. 6-10. In connection therewith it should be mentioned that the chip surface 316 is concave and that the radius of curvature that is defined by the first chip surface 316 has the corresponding relation to the height of the first cutting insert 303 as defined in connection with the first cutting insert 3 according to FIGS. 6-10.

The principal difference between the first cutting insert 303 and the first cutting insert 3 is that the first cutting insert 303 is provided with a reinforcing portion 319 that is located in the area of the free end of the chip surface 316. The reinforcing portion is in the shape of a longitudinal bead 319 that extends between the ends of the cutting edges 314, 315. The function of the reinforcing portion 319 is to delete the sharp corners in the area of the free end of the cutting edges 314, 315.

FEASIBLE MODIFICATIONS OF THE INVENTION

In the above-described embodiments, the chip surface 16,216 is concave with a certain radius of curvature R. However, within the scope of the present invention, it also conceivable that the chip surface in question is composed of two part surfaces, each of which has a certain radius of curvature. Preferably, but not necessarily, the radius of curvature of the two part surfaces are equal. The chip surface does not need to define a certain constant radius of curvature, however, it is necessary that the chip surface is concave so that a distinct positive cutting geometry of the edge portions in question is obtained.

Although the present invention has been described in connection with preferred embodiments thereof, it will be appreciated by those skilled in the art that additions, modifications, substitution and deletions may be made without departing from the spirit and scope of the invention as defined in the appended claims.

What is claimed is:

1. A milling cutter for sharpening welding electrodes, comprising
    a tool body;
    a plurality of cutting inserts fastened to the tool body, including a center cutting insert and at least two peripheral cutting inserts each including at least one cutting edge;
    the center cutting insert defining:
    two oppositely facing principal planes, two active cutting edges disposed adjacent respective principal planes, and a top surface disposed therebetween, the top surface including a concave chip surface for deflecting chips extending from and connecting said two cutting edges, wherein said concave chip surface constitutes the entire top surface, said two cutting edges for simultaneously cutting end surfaces of welding electrodes, wherein chips from said two cutting edges are deflected via said concave chip surface.

2. The milling cutter according to claim 1 wherein the tool body defines an axis of rotation and includes axial front and rear ends for receiving two welding electrodes simultaneously, the center cutting insert arranged between the front and rear ends so that the two cutting edges thereof simultaneously cut end surfaces of respective welding electrodes.

3. The milling cutter according to claim 2 wherein the tool body includes stop surfaces facing in mutually opposite directions for abutting against respective welding electrodes.

4. The milling cutter according to claim 1 wherein the concave surface defines a radius of curvature.

5. The milling cutter according to claim 4 wherein the center insert defines a height h, the radius of curvature being in the range of 0.5 h to 10.0 h.

6. The milling cutter according to claim 1 wherein the tool body forms chip spaces adjacent respective peripheral cutting inserts, each chip space extending axially away from the respective peripheral cutting insert.

7. The milling cutter according to claim 6 wherein each chip space intersects an outer circumference of the tool body.

8. A cutting insert for chip-removing machining, the insert defining two oppositely facing principal planes, active cutting edges disposed adjacent respective principal planes and tapering toward each other, and a top surface disposed therebetween, the top surface including a concave chip surface for deflecting chips extending from and connecting said two cutting edges, wherein said concave chip surfaces constitutes the entire top surface, said two cutting edges for simultaneously cutting end surfaces of welding electrodes, wherein chops from said two cutting edges are simultaneously deflected via said concave chip surface.

9. The cutting insert according to claim 8 wherein the concave surface defines a common chip surface for both cutting edges.

10. The cutting insert according to claim 9 wherein the concave surface defines a radius of curvature.

11. The cutting insert according to claim 10 wherein the insert defines a height h, the radius of curvature being in the range of 0.5 h to 10.0 h.

12. The cutting insert according to claim 8 wherein the concave surface defines a radius of curvature.

13. The cutting insert according to claim 12 wherein the insert defines a height h, the radius of curvature being in the range of 0.5 h to 10.0 h.

14. The cutting insert according to claim 8 wherein additional cutting edges are disposed adjacent respective principal planes, and a concave surface extends between the additional cutting edges.

* * * * *